(12) United States Patent
Shogaki (10) Patent No.: US 8,527,535 B2
(45) Date of Patent: Sep. 3, 2013

(54) INFORMATION PROCESSING APPARATUS, INFORMATION PROCESSING METHOD, AND PROGRAM

(75) Inventor: Yohei Shogaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 311 days.

(21) Appl. No.: 12/815,186

(22) Filed: Jun. 14, 2010

(65) Prior Publication Data

US 2010/0325147 A1 Dec. 23, 2010

(30) Foreign Application Priority Data

Jun. 17, 2009 (JP) ................................ 2009-144610

(51) Int. Cl.
*G06F 17/30* (2006.01)
(52) U.S. Cl.
USPC .................................. 707/769; 707/E17.014
(58) Field of Classification Search
USPC ................... 707/705–708, 769–775
See application file for complete search history.

(56) References Cited

U.S. PATENT DOCUMENTS

| | | | |
|---|---|---|---|
| 6,437,875 B1 | 8/2002 | Unno | |
| 7,130,487 B1 * | 10/2006 | Imagawa et al. | 382/280 |
| 7,496,559 B2 * | 2/2009 | Gross et al. | 1/1 |
| 7,945,552 B2 * | 5/2011 | Takuma et al. | 707/706 |
| 2005/0283468 A1 | 12/2005 | Kamvar | |

FOREIGN PATENT DOCUMENTS

| | | |
|---|---|---|
| CN | 1811767 A | 8/2006 |
| JP | 2006-060868 A | 3/2006 |
| JP | 2009-027474 A | 2/2009 |

OTHER PUBLICATIONS

PC JAPAN_Part 2—Making Thorough Use of Desktop Search Tools; SOFTBANK Creative Corp.; Dec. 1, 2005; pp. 81-87.

* cited by examiner

*Primary Examiner* — Fred I Ehichioya
*Assistant Examiner* — Michelle Owyang
(74) *Attorney, Agent, or Firm* — Canon U.S.A., Inc. IP Division (57) ABSTRACT

An apparatus performs a first search for first information that contains a first character input through an operation, and performs a second search for second information that contains both of the first character and a second character when the second character is input after the first search is started. Before the searches are performed, either a first search mode or a second search mode is selected: in the first search mode, a search is started for the first information independently of an input of the second character after the input of the first character; and in the second search mode, a determination is made whether or not there is an input of the second character after the input of the first character, and a search is started for the first information when there is no input of the second character is selected.

16 Claims, 12 Drawing Sheets

DESTINATION SEARCH (ONE-CHARACTER SEARCH)

DESTINATION TABLE  TYPE OF DESTINATION
SERVER ▼           ALL ▼

| TYPE | NAME | ADDRESS |
|------|------|---------|
| FAX | bfg | 03-1234-5678 |
| E-MAIL | branch | branch@abc.co.jp |

| a | b | c | d | e | f | g | h | i | j | k | l | m | n to z |

CANCEL   REFINE SEARCH                OK

FIG. 5B

DESTINATION SEARCH (ONE-CHARACTER SEARCH)

DESTINATION TABLE  TYPE OF DESTINATION
SERVER ▶            ALL ▶

| TYPE | NAME | ADDRESS |
|------|------|---------|
| E-MAIL | abc | 1234@aaa.co.jp |
| | | |
| | | |
| | | |
| | | |

| a | b | c | d | e | f | g | h | i | j | k | l | m | n to z |

| CANCEL | REFINE SEARCH | | OK |

DESTINATION SEARCH (REFINE SEARCH)

DESTINATION TABLE

SERVER ▶

TYPE OF DESTINATION

ALL ▶

| TYPE | NAME | ADDRESS |
|---|---|---|
| E-MAIL | abc | 1234@aaa.co.jp |
| E-MAIL | def | def@aaa.co.jp |
| FAX | bfg | 03-1234-5678 |
| E-MAIL | branch | branch@abc.co.jp |
| FAX | hij | 03-2222-2222 |
| FAX | xyz | 06-5678-6789 |

| a | b | c | d | e | f | g | h | i | j | k | l | m | n to z | b

BACKSPACE  CLEAR

CANCEL  REFINE SEARCH CANCEL  OK

FIG. 7B

DESTINATION SEARCH (REFINE SEARCH)

| DESTINATION TABLE | SERVER ▶ | | TYPE OF DESTINATION | ALL ▶ |

| TYPE | NAME | ADDRESS |
|---|---|---|
| FAX | bfg | 03-1234-5678 |
| E-MAIL | branch | branch@abc.co.jp |
| | | |
| | | |
| | | |

| a | b | c | d | e | f | g | h | i | j | k | l | m | n to z |

| b | | | | BACKSPACE | CLEAR |

| CANCEL | | | REFINE SEARCH CANCEL | | OK |

FIG. 8A

DESTINATION SEARCH (REFINE SEARCH)

DESTINATION TABLE: SERVER ▶
TYPE OF DESTINATION: ALL ▶

| TYPE | NAME | ADDRESS |
|---|---|---|
| E-MAIL | abc | 1234@aaa.co.jp |
| E-MAIL | def | def@aaa.co.jp |
| FAX | bfg | 03-1234-5678 |
| E-MAIL | branch | branch@abc.co.jp |
| FAX | hij | 03-2222-2222 |
| FAX | xyz | 06-5678-6789 | a  b  c  d  e  f  g  h  i  j  k  l  m  n to z bf

CANCEL   BACKSPACE   CLEAR   REFINE SEARCH CANCEL   OK

FIG. 8B

DESTINATION SEARCH (REFINE SEARCH)

DESTINATION TABLE: SERVER ▶

TYPE OF DESTINATION: ALL ▶

| TYPE | NAME | ADDRESS |
|---|---|---|
| FAX | bfg | 03-1234-5678 |
| | | |
| | | |
| | | |
| | | |

| a | b | c | d | e | f | g | h | i | j | k | l | m | n to z | bf    BACKSPACE    CLEAR

CANCEL    REFINE SEARCH    CANCEL    OK

FIG. 9

INFORMATION PROCESSING APPARATUS, INFORMATION PROCESSING METHOD, AND PROGRAM

BACKGROUND OF THE INVENTION

1. Field of the Invention

The present invention relates to an information processing apparatus that searches for information stored in a storage device.

2. Description of the Related Art

Conventionally, a searching mechanism is known in which a character is input by a user as a search condition to search for information stored in a storage device.

For example, in Japanese Patent Application Laid-Open No. 2006-060868, an information processing apparatus has addresses information registered therein in advance as destinations of data, so that a user of the apparatus can search and use the registered address information. In the apparatus, the destination name that contains a character input by the user is identified, so that address information corresponding to the identified destination name is output as a search result.

Alternatively, to search for a document out of a storage device having a large number of documents registered therein, files each having a file name that contains a character input by a user may be identified, so that the files are output as a search result.

A refine search is also known as a search method for information stored in a storage device. In the refine search, a first search is performed under a first search condition a user specified, and if the user further specifies a second search condition, a second search is performed under the second search condition based on the result for the first condition. The second search is performed for more accurate (refined) result when the amount of information obtained as the result for the first criteria is too large.

Nowadays, a refine search mechanism is known, in which a refine search is performed whenever a character is input by a user. For example, when a user inputs the character "a", a first search is performed for information of character strings starting with "a", and then when a user inputs the character "b", a second search is performed for information of character strings starting with "ab".

The repetition of refine searches for every input of character specified by a user may lead to the following situation.

For example, Japanese Patent Application Laid-Open No. 2006-060868 discusses a data processing apparatus, in which when a search is performed for information stored in an external storage device that is connected to the apparatus via network, a request for an search execution and a result of the search are transmitted through the network at every search. When network traffic is heavy, it takes long time before the result returns.

When it takes long time to perform a search based on "a", a user may input the character "b" before the search result based on "a" is returned to the user. In this case, the on-going search based on "a" is cancelled, and a fresh search based on "ab" is started, which makes the processes of the search based on "a" a waste.

As one solution to cope with the above situation, an approach can be proposed, in which after the character "a" is input, a search is started in response to an instruction from a user for search execution. If a user wants to input "b" based on a search result for "a", the user can give an instruction for a search execution after inputting "a". In contrast, if a user wants to execute a search based on "ab" without a prior search based on "a", the user can give an instruction for a search execution after inputting "a" and "b". This eliminates the above described waste.

When a search is performed for information stored in a storage area in the self apparatus, however, a user can have a response for a search more quickly as compared to the case of a search for information stored in an external storage area. This is because the former search does not need any transmission/receipt of information via a network. In a search showing a quick response, even if the search is automatically started upon an input of "a", the search is unlikely to be cancelled in the middle because a result of the search based on "a" can be obtained immediately.

If, however, the above approach, in which an instruction for search execution is waited for after an input of a character by a user, is applied to the case with a search for information that is stored in a storage area of a self apparatus, an operational issue may occur. More specifically, a user may be required to input a character and instruct a search execution in two steps, which may be troublesome for a user.

Thus conventionally, searches have been performed in the same manner irrespective of the conditions for the searches (i.e., the location of a storage device storing the information to be searched for, or a length of a response time from a storage device), which has caused the above described inconvenience.

SUMMARY OF THE INVENTION

According to an aspect of the present invention, an apparatus includes: an input unit configured to input a first character through an operation; a search unit configured to perform a first search for first information that contains the first character, and perform a second search for second information that contains both of the first character and a second character when the second character is input after the first search is started, the search unit performing the first search in a first search mode in which a search is started for the first information independently of an input of the second character after the input of the first character, or in a second search mode whether or not there is an input of a second character after the input of the first character, and a search is started for the first information when there is no input of the second character.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

The exemplary embodiments are not intended to limit the scope of the claimed invention, and not all of the combinations of features described in the exemplary embodiments are necessary for the inventive solution.

Figure 1:
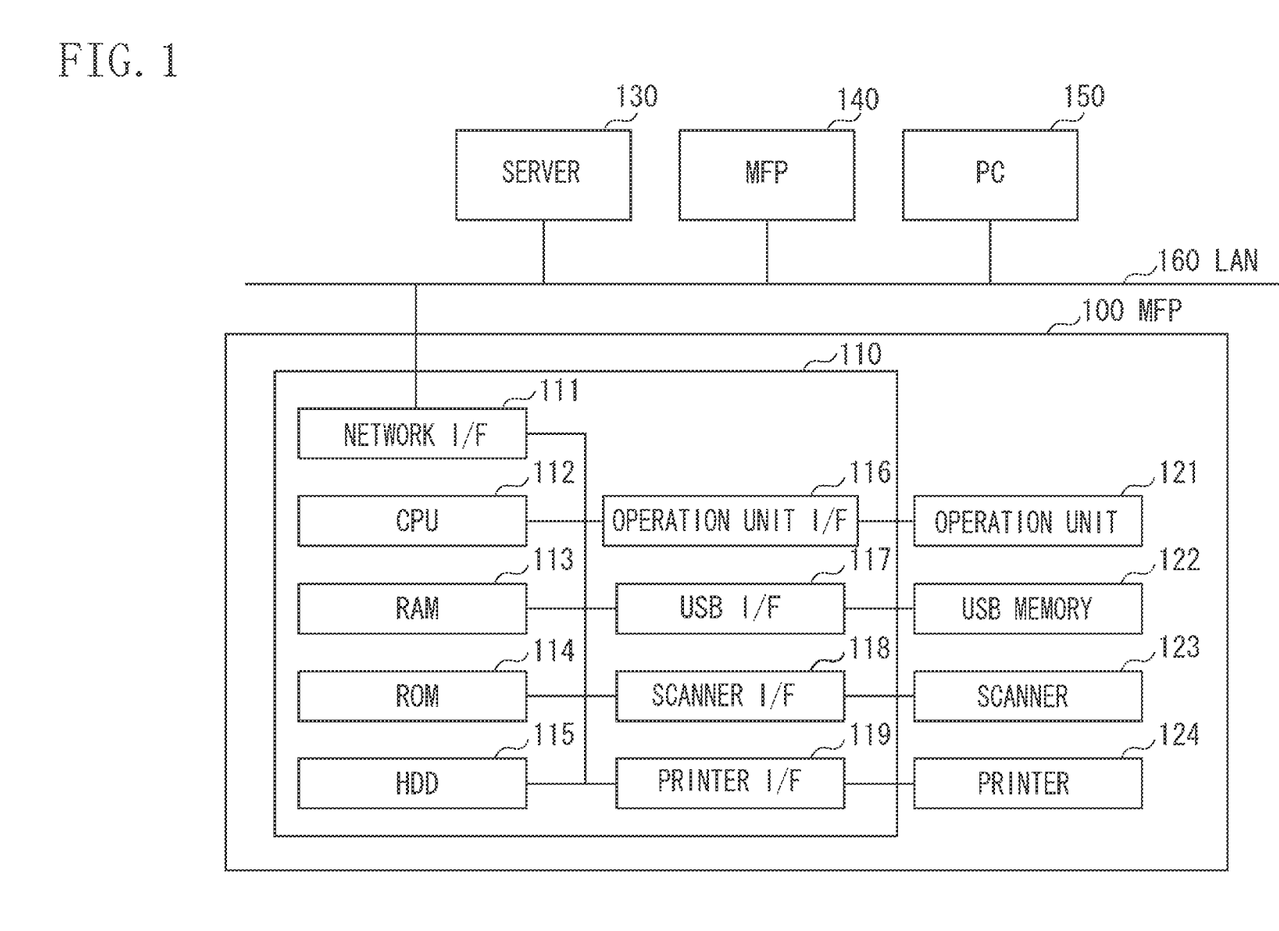
FIG. 1 illustrates a hardware configuration of a multifunction peripheral (MFP) and the overall configuration of a system including the MFP.

FIG. 1 illustrates a hardware configuration of an MFP 100 which is an information processing apparatus of a first exemplary embodiment, and the overall configuration of the system including the MFP 100.

The MFP 100 includes a control unit 110, an operation unit 121, a universal serial bus (USB) memory 122, a scanner 123, and a printer 124. The control unit 110 includes a central processing unit (CPU) 112 that implements software programs (control programs) in the MFP 100, and controls the entire apparatus. A random access memory (RAM) 113 is used to store temporal data while the CPU 112 is controlling the apparatus. A read only memory (ROM) 114 stores boot programs and fixed parameters of the apparatus.

A hard disk drive (HDD) 115 is used to store various data including destination tables (which will be described later in detail) for management of destination information. An operation unit I/F 116 controls the operation unit 121 to display various operation screens on a liquid crystal panel of the operation unit 121, and transmits instructions input through an operation screen from user to the CPU 112.

A USB I/F 117 connects the USB memory 122, which is removable from the MFP 100, to the control unit 110. The USB memory 122 is used to store data such as destination tables, similar to the HDD 115.

A scanner I/F 118 controls the scanner 123, and a printer I/F 119 controls the printer 124. The scanner 123 reads images on a document to generate data of the image. The printer 124 prints out images on recording media based on the image data. A network I/F 111 connects the control unit 110 (MFP 100) to a local area network (LAN) 160, and controls transmission/receipt of information between terminals over the LAN 160.

The MFP 100, a server 130, an MFP 140, and a personal computer (PC) 150 are connected to the LAN 160 for mutual communication. The MFP 140 has a configuration and functions similar to the MFP 100.

The server 130 serves as an external storage device, and stores various data such as destination tables, similar to the HDD 115. The server 130 herein is a directory server that supports lightweight directory access protocol (LDAP). Thus, the MFP 100 can access the server 130 via the LDAP to search for and refer to a variety of information stored in the server 130.

The MFP 100 has a function to transmit data via the LAN 160, and, for example, is able to transmit image data input from the scanner 123 or image data stored in the HDD 115 using different transmission protocols. More specifically, the MFP 100 can attach image data to electronic mails (E-mails) to transmit to the PC 150. The MFP 100 also can transmit image data to the MFP 140 utilizing ITU-T.37 standard for Internet FAX transmissions. Furthermore, the MFP 100 has a FAX modem (not illustrated) which is used to transmit image data in G3 facsimile transmission via public phone line.

Operations of the MFP 100 will be described in detail, the operations for searching for and specifying a destination of image data when the MFP 100 transmits the image data using the above function of transmission. As an example of the operations to search for information stored in a storage device, a case where a destination (address information) is searched for is described herein. The following search system, however, can be applied to searches for information having different contents such as files and Web sites, as well as destinations.

Figure 2:
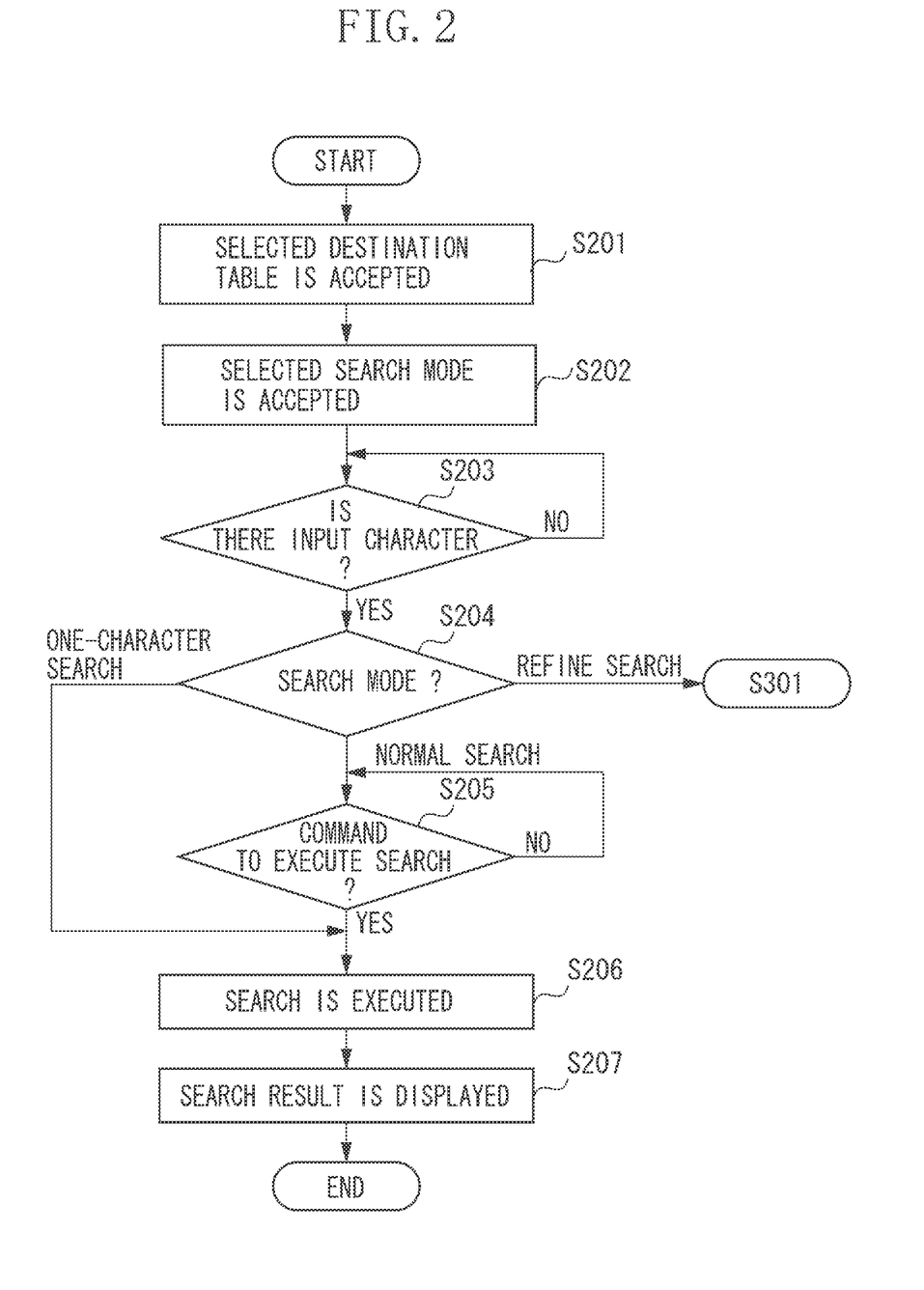
FIG. 2 is a flowchart illustrating operations of an MFP.
Figure 3:
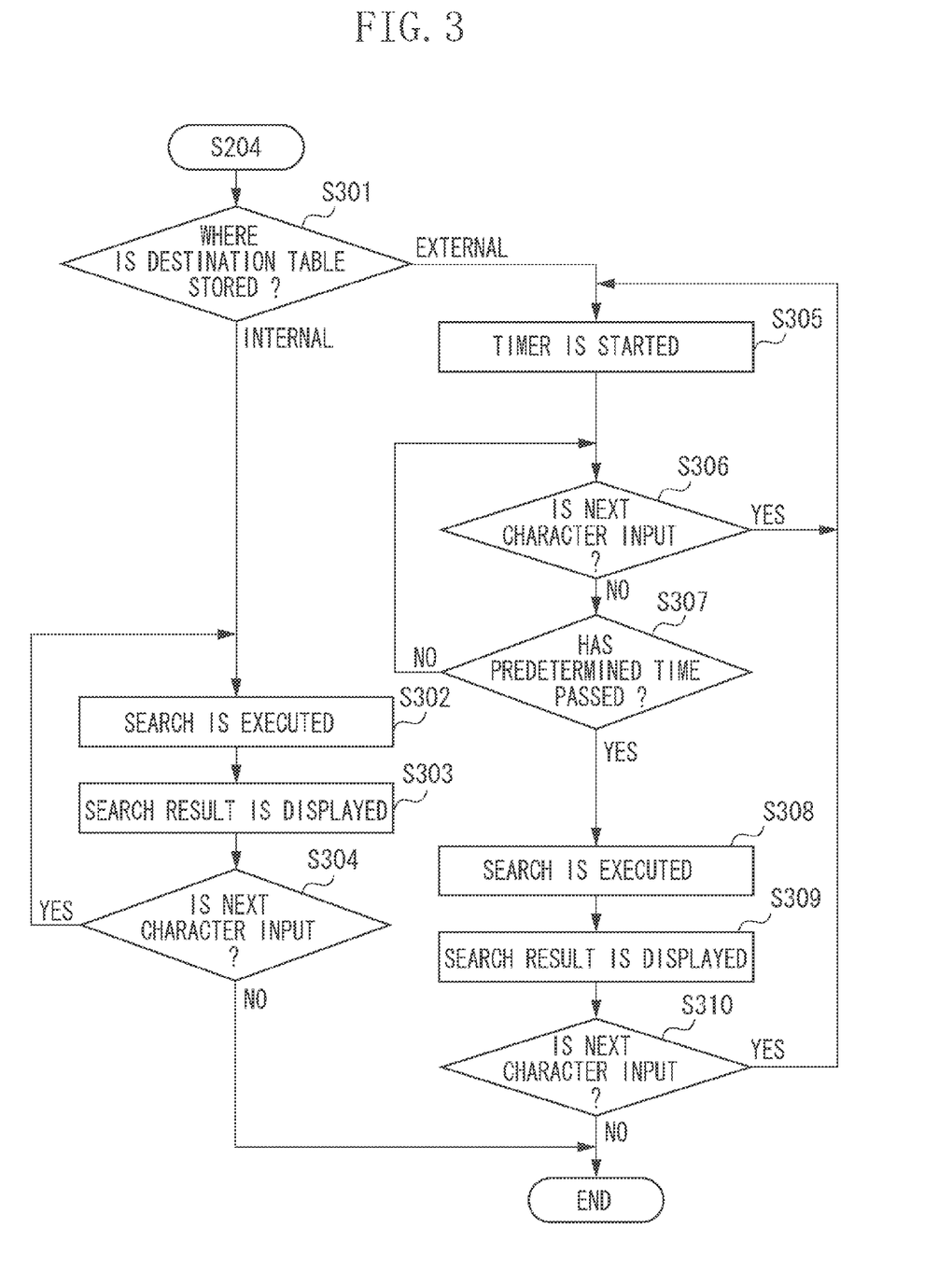
FIG. 3 is a flowchart illustrating operations of an MFP.

FIGS. 2 and 3 are flowcharts each illustrating sequential processes for operating the operation unit 121 by a user to search for destinations stored in the HDD115, the USB memory 122, or the server 130. The operations (steps) in the flowcharts in FIGS. 2 and 3 are performed when a control program in the HDD 115 is executed by the CPU 112 of the MFP 100.

Figure 4:
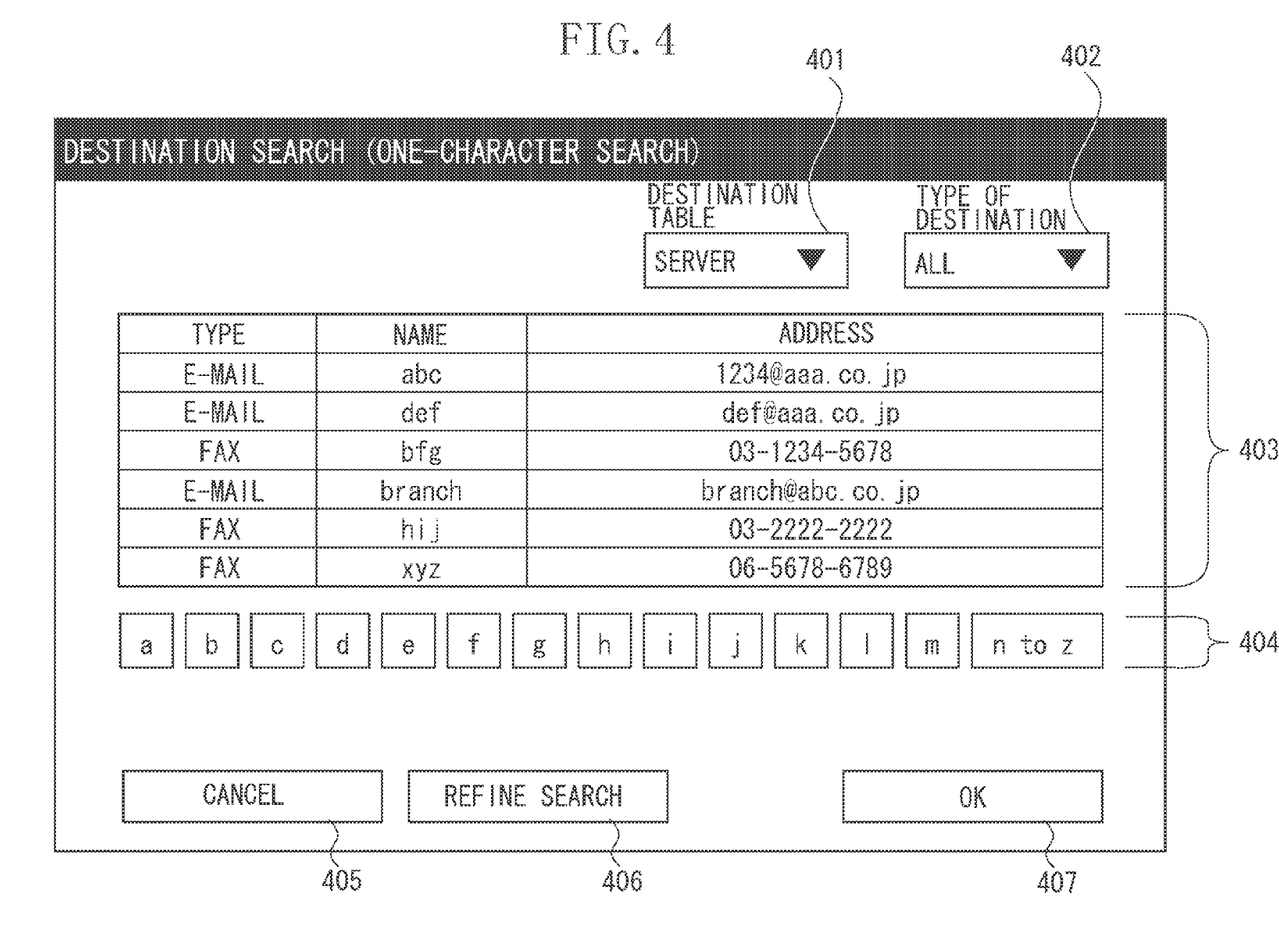
FIG. 4 illustrates an operation screen for searching for destination names in a one-character search mode.

FIG. 4 illustrates an operation screen which is displayed when a user gives an instruction to use the transmission function of the MFP 100, and also gives an instruction to refer to a destination table that is registered in advance to specify destinations of data.

A drop-down list 401 is used to select a destination table to which a reference is made. The "server" on the screen illustrated in FIG. 4 indicates that a selection was made to refer to a destination table stored in the server 130. The drop-down list 401 has a choice of "local" other than the "server". When the "local" is selected, a reference is made to a destination table stored in the HDD 115 or the USB memory 122.

The drop-down list 402 is used to select a type of destination to which a reference is made. The HDD 115, the USB memory 122, and the server 130 each have destinations via communication services such as E-mail, Internet FAX, facsimile (G3) registered therein together with an attribute corresponding to each communication service. When a user wants to refer to destinations via E-mail among the communication services, the user selects "E-mail" in the drop-down list 402; whereas when a user wants to refer to destinations via Internet FAX, the user selects "Internet FAX" in the drop-down list 402. On the screen of FIG. 4, the "all" is illustrated, which indicates that a reference is made to the entire destinations without specifying a communication service.

An address display area 403 displays a list of destinations that are in the destination table selected in the drop-down list 401 and also belong to the type selected in the drop-down list 402. In order to select a destination, a user touches a display area of a destination displayed in the address display area 403, which inverts the color of the selected area as a selected data destination.

Character input keys 404 are used to input a character as a search condition to find out an appropriate destination out of a large number of destinations registered in the destination table. In FIG. 4, the keys from "a" to "m" are displayed. When a user wants to input other character (including numerals and symbols), the user can press the "n to z" key on the right side in FIG. 4, which switches the keys from "a" to "m" into another series of keys.

If a cancel button 405 is pressed, a current reference to a destination table (search for a destination) is interrupted, and the screen illustrated in FIG. 4 is shut off. In contrast, when an OK button 407 is pressed while at least one destination is selected in the address display area 403, the selected destination is determined as a data destination, and the screen illustrated in FIG. 4 is shut off.

A refine button 406 is pressed to switch between search modes: from a one-character search mode to a refine search mode. The MFP 100 has three modes as methods for searching destinations: a normal search mode, a one-character search mode, and a refine search mode.

In the normal search mode, an instruction is given to perform a search execution when a user inputs one or more characters as a search condition and presses down a "search" button (not illustrated). When the execution instruction is entered, a search is performed for destination names that each contain the input one or more characters.

In the one-character search mode, when a user inputs one character, a search is performed for destination names that each start with the input character.

In the refine search mode, when a user inputs a first character, a search is performed for destination names that each start with the input first character. Furthermore, in response to an input of a second character by the user, a search is performed for destination names that each contains the input first character as a first character and the input second character as a second character. In the exemplary embodiment, the refine search mode has two levels to switch: one level at which a search is performed immediately after an input of a first character; and another level at which a search is performed only based on a confirmation that a second character will not be input after an input of a first character.

In the flowchart of FIG. 2, in step S201, a selection of a destination table to be searched for is received. More specifically, from a plurality of destination tables in the drop-down list 401 in FIG. 4, a user selects one destination table, which is received by the CPU 112.

In step S202, a selection of a search mode is received. As described above, the screen in FIG. 4 illustrates a case where the one-character search mode is selected, and if a user wants to select the refine search mode, the user presses down the refine button 406. A button to select the normal search mode is not illustrated in FIG. 4, but a user can press a "normal search" button (not illustrated) to select the normal search mode.

In step S203, it is determined whether or not the user has already input a character or not. In the exemplary embodiment, when one of the character input keys 404 from "a" to "m" is pressed down, it is determined that a character is input by the user, and the process goes to step S204.

In step S204, it is determined which search mode was selected in step S202. If the determination indicates a selection of the normal search mode, the process goes to step S205, where it is determined whether or not an instruction for a search execution is given by the user.

If it is determined in step S205 that an instruction of search execution is issued, the process goes to step S206, where a search is performed for destinations that each contain the input one or more characters. If it is determined in step S205 that no instruction of search execution is issued, the process waits for an instruction of search execution.

If it is determined in step S204 that the one-character search mode is selected, the process goes to step S206, where a search is performed for destination names that each start with the input character. In step S207, the resultant destinations are displayed.

Figure 5A:
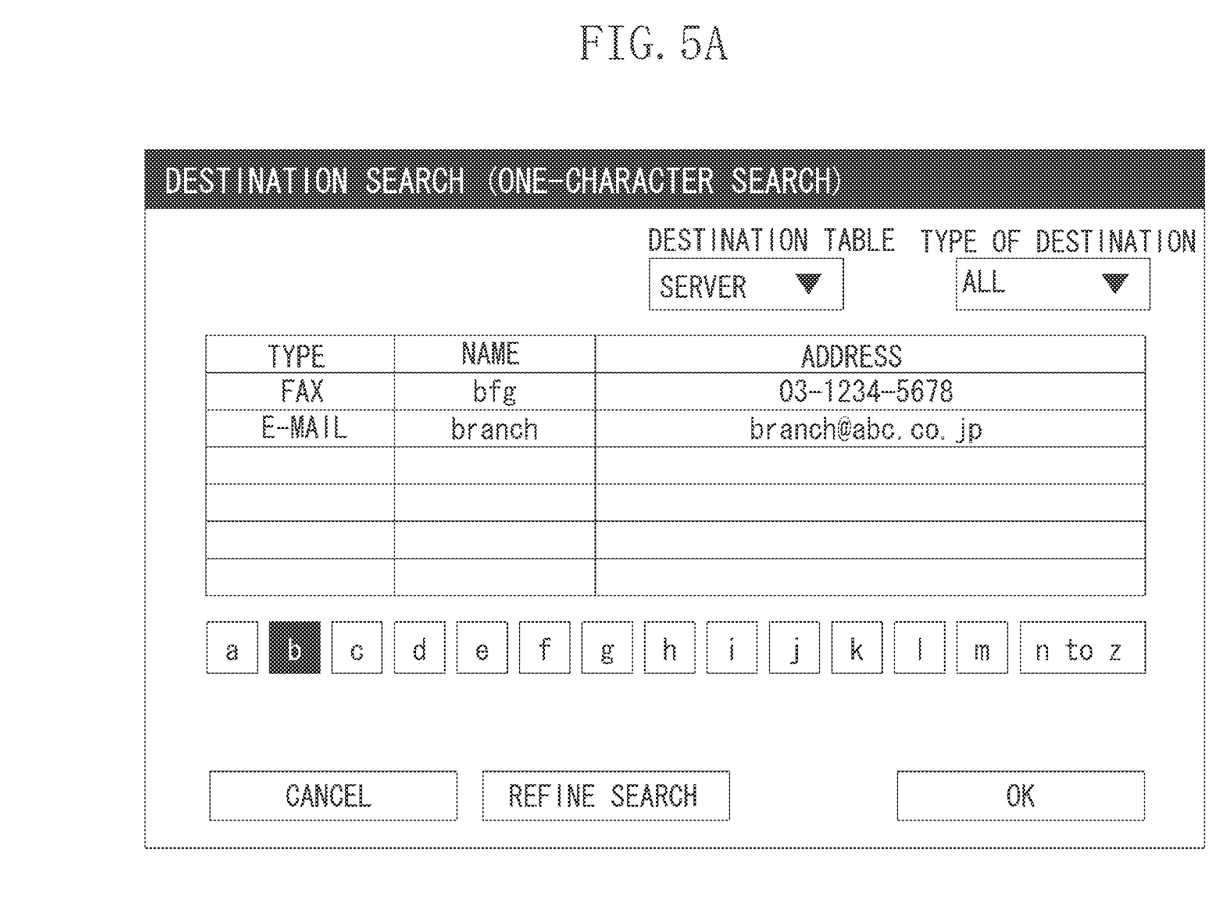
FIG. 5A illustrates an operation screen for searching for destination names in a one-character search mode.

FIG. 5A illustrates a screen which is displayed when the "b" key is pressed down among the character input keys 404 on the screen illustrated in FIG. 4. In FIG. 5A, destination names that each start with the "b" are extracted from a plurality of destinations that are registered in advance, and the extracted destination names are displayed in the address display area 403. In this case, the destination names "bfg" and "branch" are displayed on the screen in FIG. 5A.

Figure 5B:
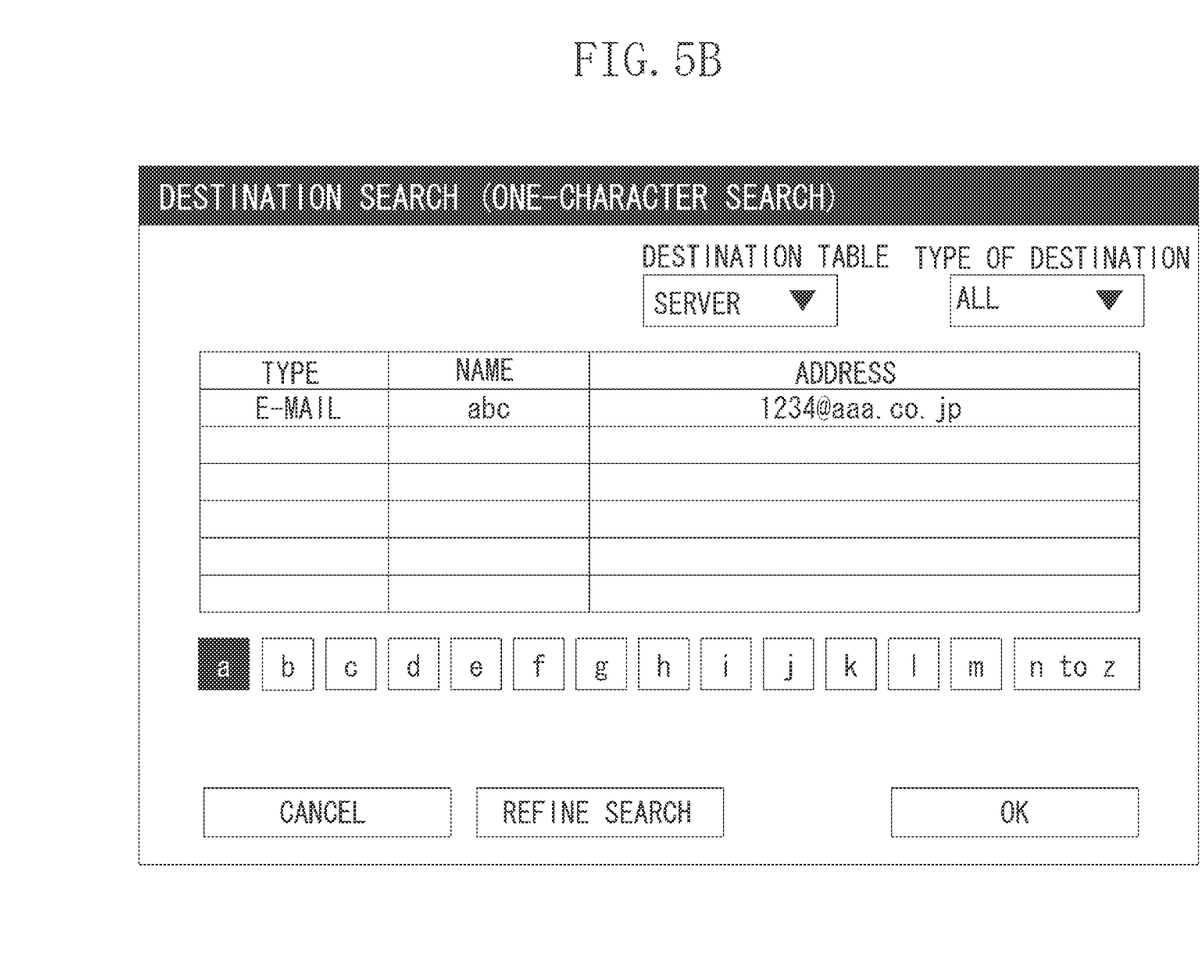
FIG. 5B illustrates an operation screen for searching for destination names in a one-character search mode.

FIG. 5B illustrates a screen after the "a" key is pressed down in the situation illustrated in FIG. 5A. As described above, in the one-character search mode, a search is performed for destinations that contain a character input by a user. Accordingly, when the "a" key is pressed down after the "b" key is pressed down, the search result based on the character "b" is reset, and the process returns to step S201. In other words, in step S206, a new search is performed for destination names that each contain the input character "a", and as a result, the destination name "abc" is displayed on the operation screen illustrated in FIG. 5B for example.

If it is determined in step S204 that the refine search mode is selected, the process goes to step S301 in FIG. 3. In step S301, it is determined the destination table selected in step S201 is stored in an external storage device (i.e., the server 130) or in the storage device (i.e., the HDD 115 or the USB memory 122) in the MFP 100.

If the selected destination table is stored in the storage device in the MFP 100, the process goes to step S302, where a search is performed for destination names that each start with the input character. In step S303, the search result is displayed. In step S304, it is determined whether or not another one of the character input keys 404 was pressed down. If there is another input, the process goes back to step S302: otherwise, the process ends.

Figure 6:
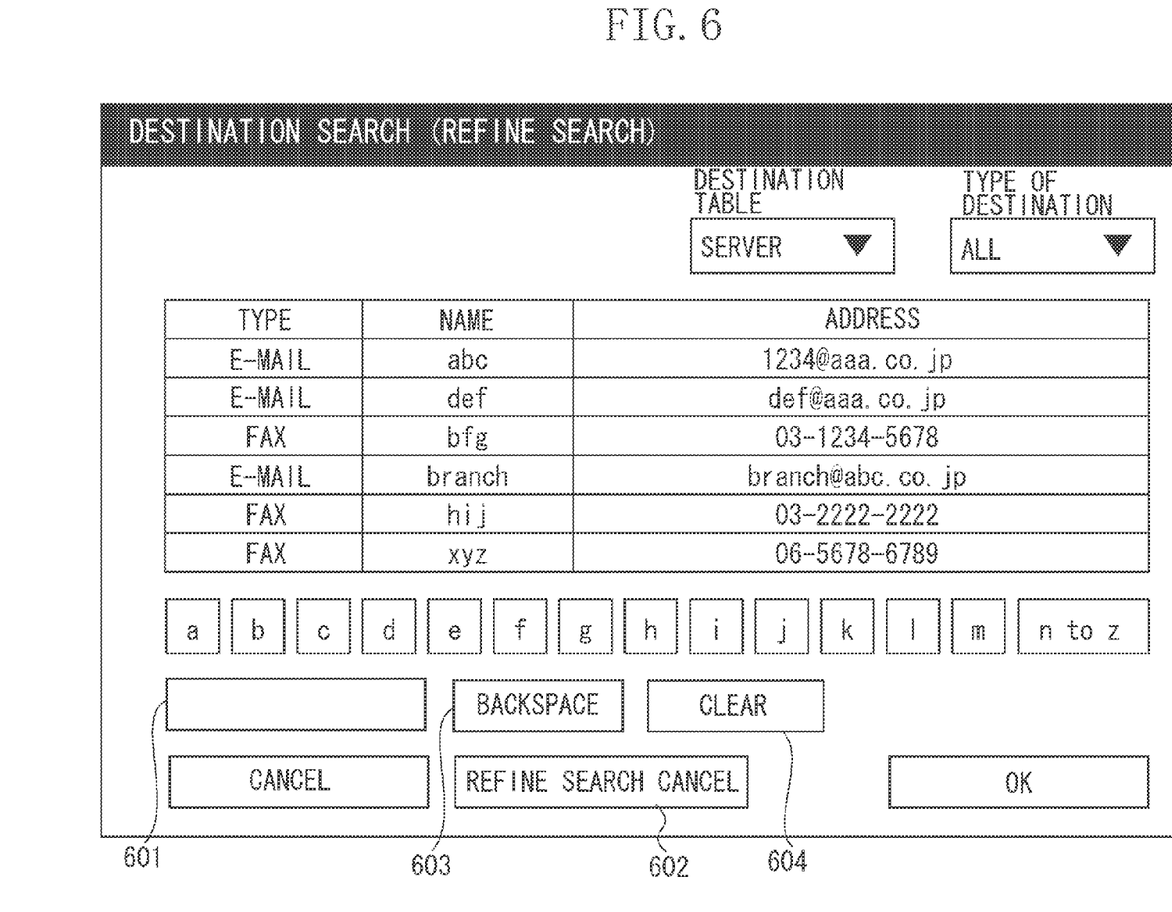
FIG. 6 illustrates an operation screen for searching for destination names in a refine search mode.

FIG. 6 illustrates an operation screen which is displayed when a refine button 406 in FIG. 4 is pressed down. On the operation screen in FIG. 6, unlike the screen in FIG. 4, a refine cancel button 602 is displayed instead of the refine button 406. When the refine cancel button 602 is pressed down, the refine search mode is cancelled and switched into the one-character search mode. In other words, the operation screen in FIG. 4 is displayed.

The operation screen in FIG. 6 further displays an input-character display area 601, a backspace button 603, and a clear button 604. The input-character display area 601 displays the one or more characters in the order input in the refine search mode. A backspace button 603 is used to erase the characters displayed in the input-character display area 601 one by one. The clear button 604 is used to erase the characters displayed in the input-character display area 601 at one time.

Figure 7A:
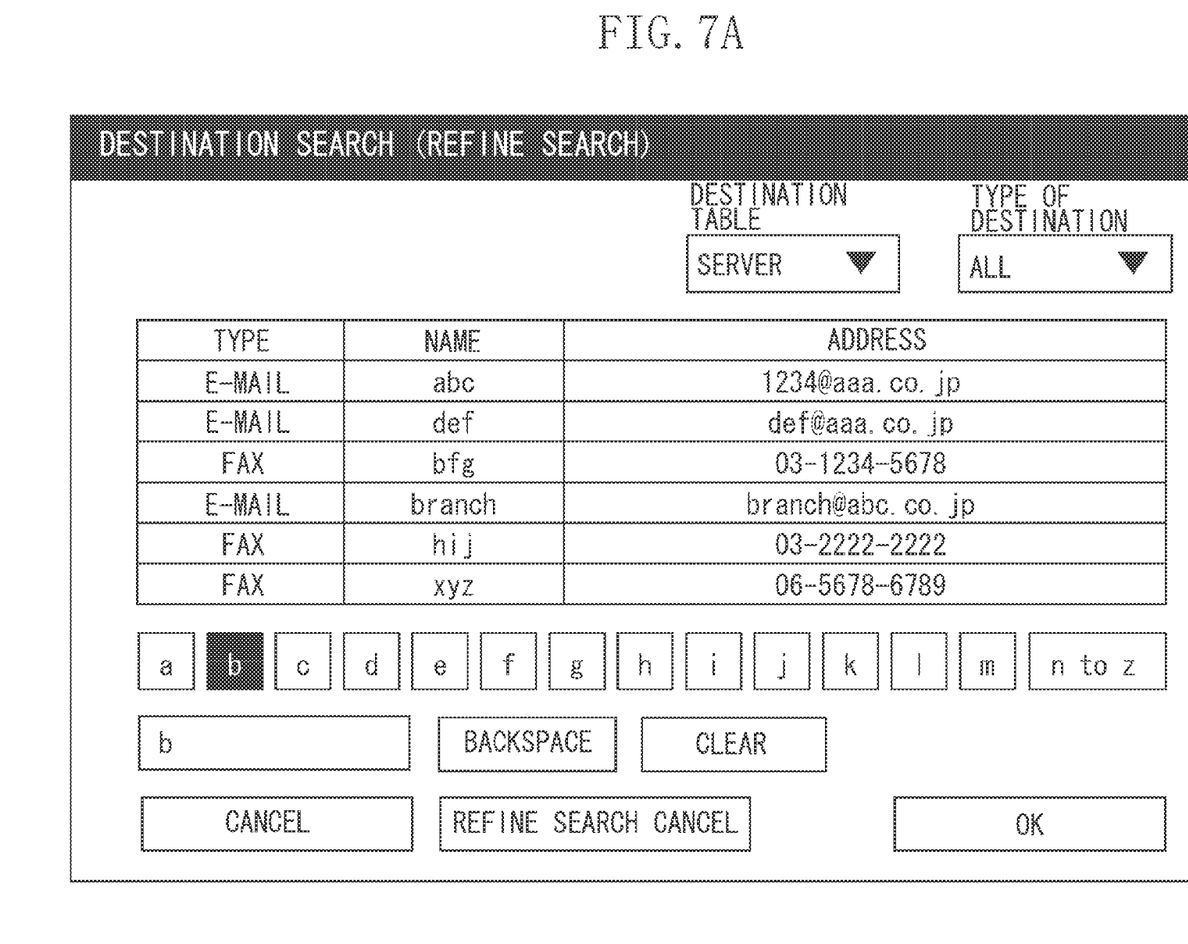
FIG. 7A illustrates an operation screen for searching for destination names in a refine search mode.

FIG. 7A illustrates an operation screen which is displayed when the "b" key is pressed down among the character input keys 404 on the operation screen illustrated in FIG. 6. As illustrated in FIG. 7A, when the "b" key is pressed down, the color of the "b" key is inverted, and the character "b" is displayed also in the input-character display area 601.

Figure 7B:
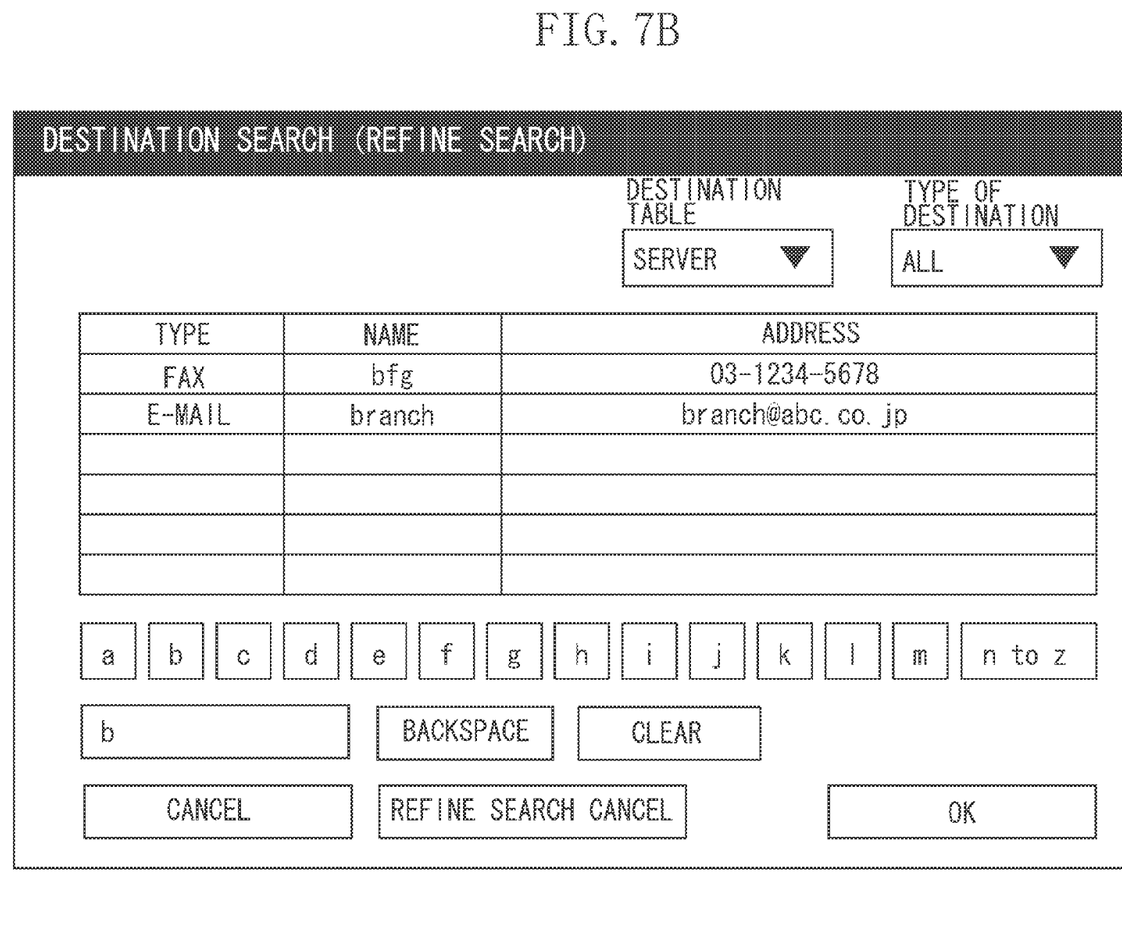
FIG. 7B illustrates an operation screen for searching for destination names in a refine search mode.

If the selected destination table is stored in the storage device in the MFP 100, a search is performed immediately after the display of the screen illustrated in FIG. 7A, and the search result is displayed on the screen illustrated in FIG. 7B. On the screen in FIG. 7B, destinations that each start with the "b" are extracted from the destinations registered in advance, to be displayed in the address display area 403. In this case, the destination names "bfg" and "branch" are displayed on the screen in FIG. 7B.

When the "f" key is further pressed on the operation screen in FIG. 7B, a search is performed for names that each start with "bf". FIG. 8B illustrates an operation screen on which the search result is displayed. As described above, in the refine search mode, if a user further inputs a second character after a search is performed for destination names that each start with a first input character, a search is performed for destination names that each contain the input first character as a first character and the input second character as a second character.

When a second character is input in the refine search mode, unlike in the one-character search mode, the search result based on the input first character (i.e., "b" in the exemplary embodiment) is not reset. When the character "f" is input subsequent to the character "b", destination names that each contain the character "b" as a first character and the character "f" as a second character are displayed as a search result. In other words, the destination name "bfg" is displayed on the operation screen illustrated in FIG. 8B for example.

As described above, when the refine search mode is selected and a selected destination table is stored in an internal storage device, a search is performed for destinations containing the first character immediately after a user selects a first search mode and inputs a first character, and the search result is displayed. In other words, independently of the presence of a further input of a second character, in response to the input of the first character, a search is performed for destination names that each contains the first character. Similarly, when a second character is input after that, independently of the presence of a further input of a third character, in response to the input of the second character, a search is performed for destination names that each contains both of the first and second characters.

In contrast, if it is determined in step S301 that a selected destination table is stored in an external storage device, the process goes to step S305, and a timer starts measuring time. In step S306, it is determined whether or not a second character was input. If it is determined that a second character is input, the process goes back to step S305 and the time measured by the timer is reset for a fresh measurement.

In contrast, if it is determined in step S306 that a second character is not input, the process goes to step S307, where it is determined whether or not the time measured by the timer exceeds a predetermined period of time. If the time exceeds the predetermined period of time, the process goes to step S308: otherwise, the process goes back to step S306. In step S308, a search is performed for destination names that each contains the input one or more characters, and in step S309, the search result is displayed. In step S310, it is determined whether or not one of the character input keys 404 was further pressed down, and if one of the character input keys 404 is further pressed down, the process goes back to step S305: otherwise, the process ends.

Processes for searching for destinations from destination tables stored in an external storage device will be described in detail with reference to FIGS. 6 to 8.

First, in FIG. 6, when the "b" key among the character input keys 404 is pressed down, the operation screen illustrated in FIG. 7A is displayed. In contrast to the case where a search is performed immediately for destinations from internally stored destination tables, in the case where a search is performed for destinations from externally stored destination tables, the process waits for an input of a second character while the operation screen in FIG. 7A is displayed. This waiting corresponds to the processes in step S305 to step S307 in FIG. 3.

When a second character is not input within a predetermined period of time, it is determined that there is no input of a second character, and a search is performed for destinations that each contains the input first character. As a result, the operation screen illustrated in FIG. 7B is displayed. The predetermined period of time in the exemplary embodiment is one second, but can be set by a manager according to the learning level of a user who operates the apparatus.

Figure 8A:
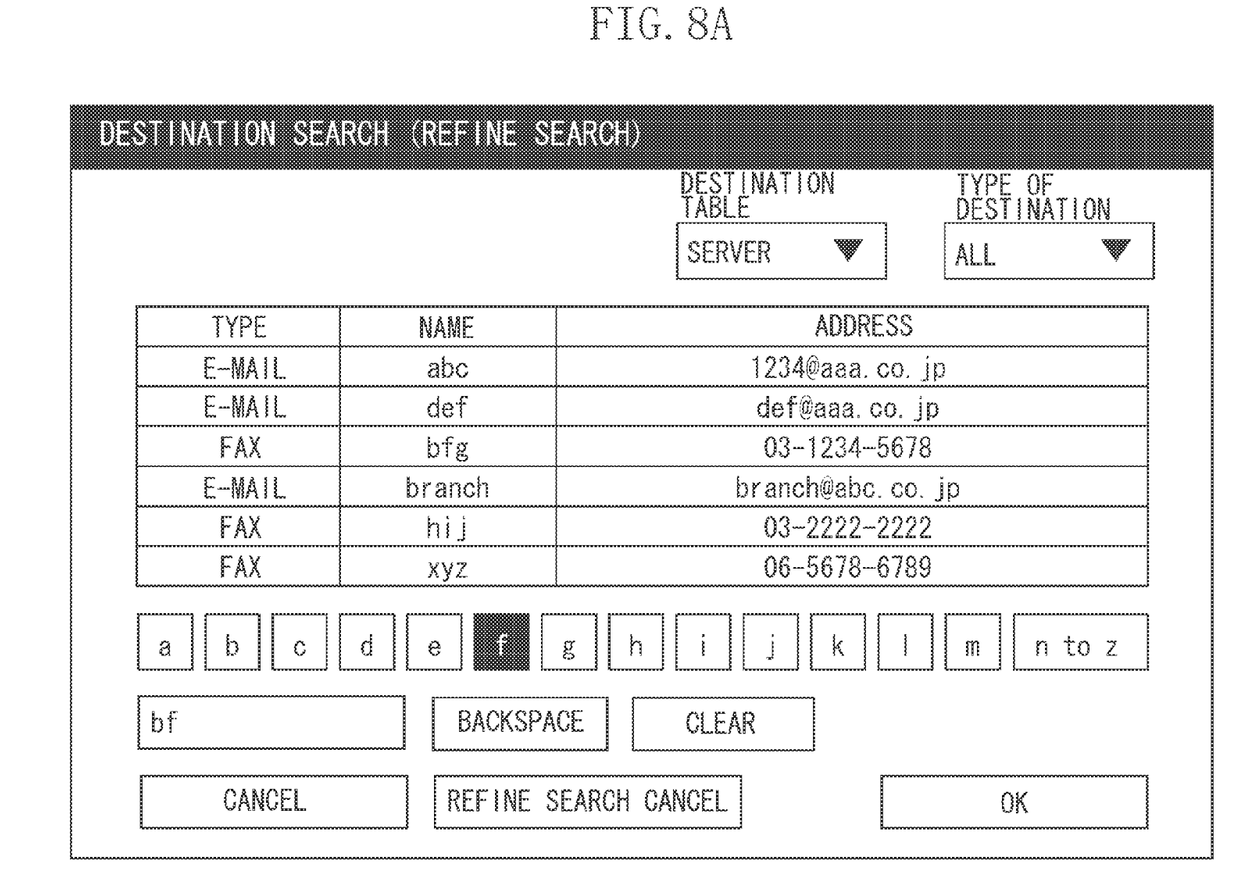
FIG. 8A illustrates an operation screen for searching for destination names in a refine search mode.
Figure 8B:
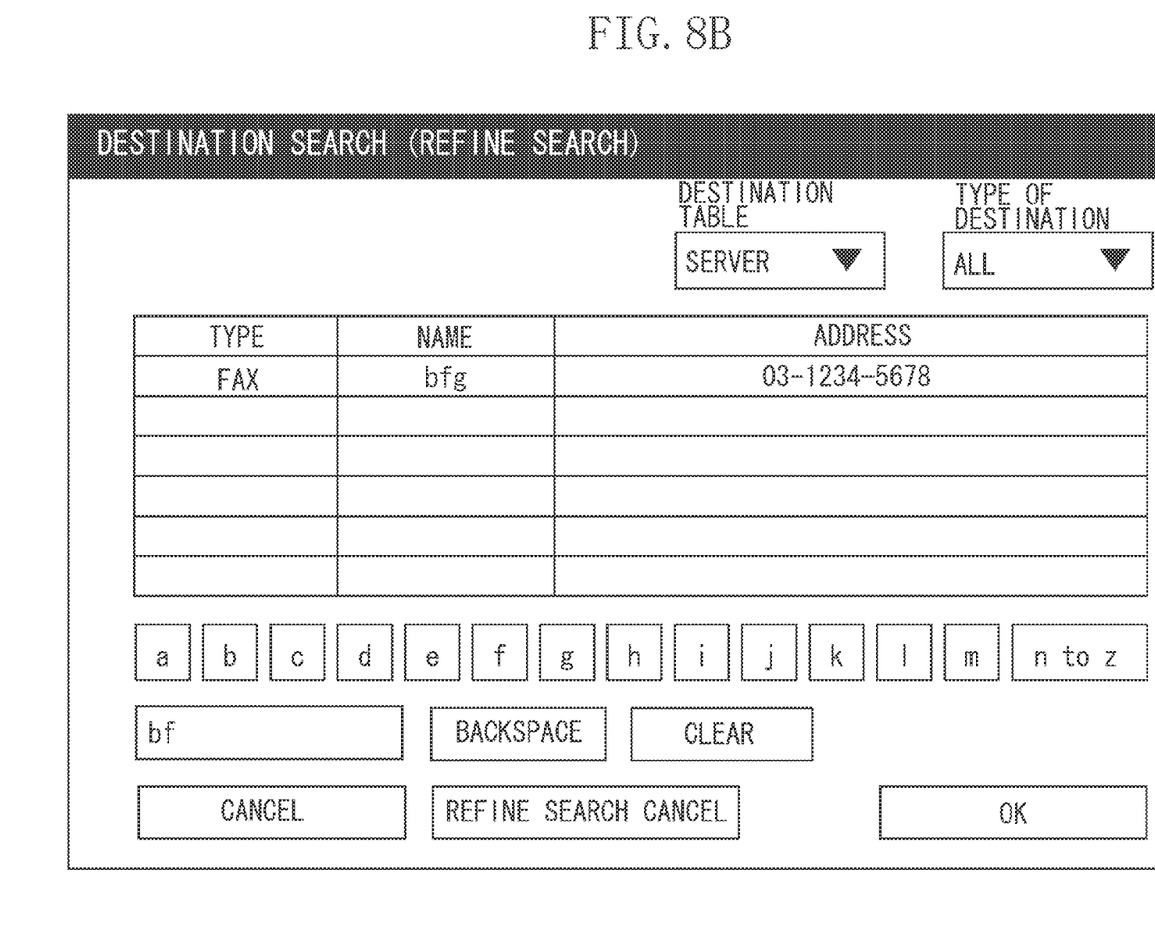
FIG. 8B illustrates an operation screen for searching for destination names in a refine search mode.

When a second character "f" is input within a predetermined period of time, the operation screen illustrated in FIG. 8A is displayed, and the timer is restarted. As in the case where the first character is input, the process waits for an input of a third character with the operation screen in FIG. 8A being displayed. If a third character is not input within a predetermined period of time, it is determined that there is no input of a third character, and a search is performed for destinations that each contain both of the input first and second characters. As a result, the operation screen illustrated in FIG. 8B is displayed.

As described above, when the refine search mode is selected and a selected destination table is stored in an external storage device, after a second search mode is selected and a first character is input, it is determined whether or not a second character is input. If it is determined that there is no input of a second character, a search is performed based on the first character.

This prevents unnecessary waste of time that occurs when a search based on a first character takes a long time, and thereby before a result of the search is obtained, a second character is input which interrupts the search based on the first character. As a result, the accesses from the MFP 100 to the server 130 that are eventually useless can be reduced, and the work load of the search processes on the server 130 can be decreased.

In the above example, it is determined that there is no input of a second character when a second character is not input within a predetermined period of time in the case where a selected destination table is stored in an external storage device, but the determination can be made based on other conditions. For example, it may be determined that there is no input of a second character when an instruction for a search execution is given by the user after an input of a first character as in the normal search.

Next, a second exemplary embodiment of the present invention will be described. In the first exemplary embodiment, a search mode is switched depending on whether a selected destination table is internally stored or outside the MFP 100. In the second exemplary embodiment, the search mode is switched depending on a time of response from a storage device that stores destination tables. The configurations in the second exemplary embodiment similar to those of the first exemplary embodiment are designated with the same reference numerals, which will not be described.

Figure 9:
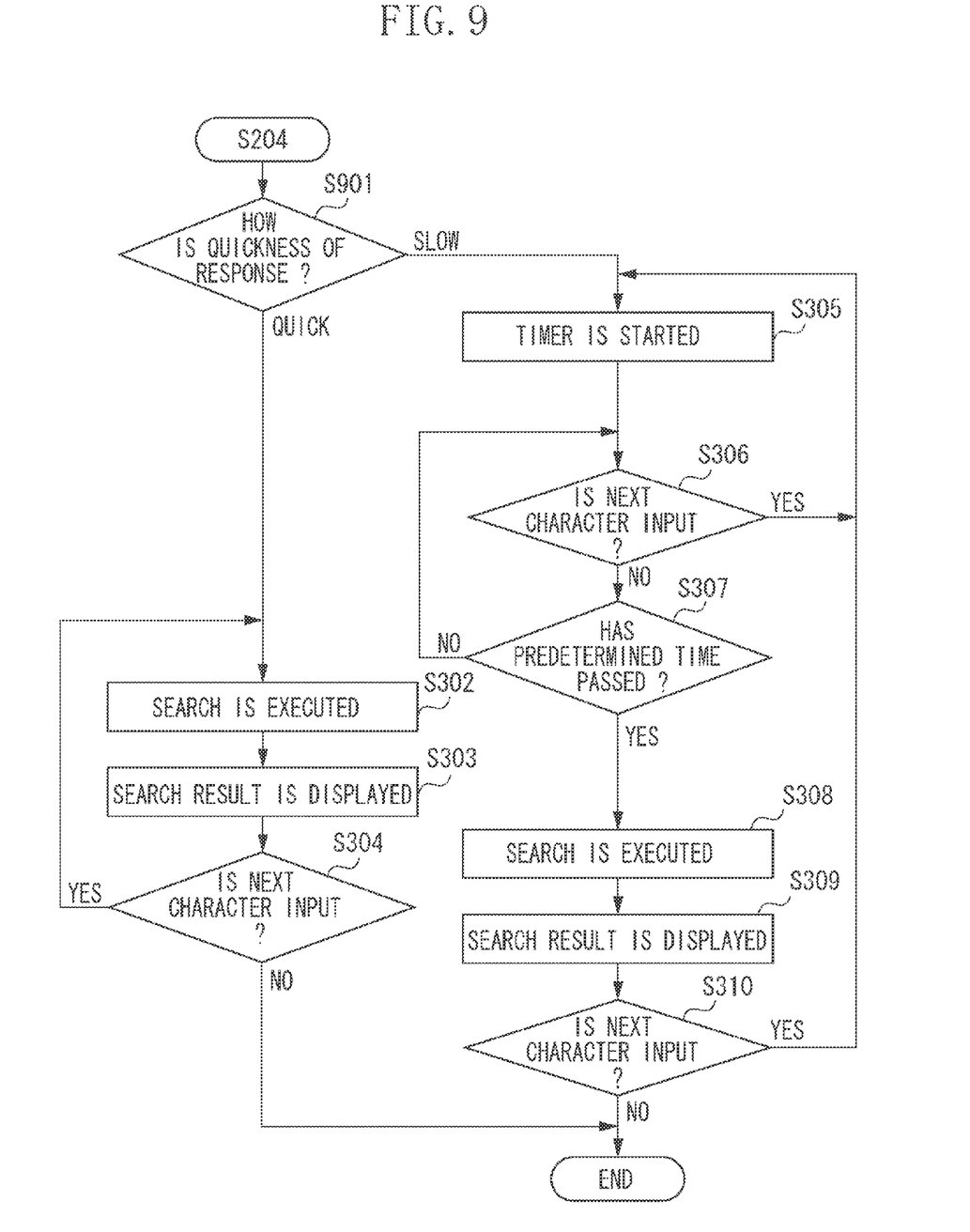
FIG. 9 is a flowchart illustrating operations of an MFP.

FIG. 9 is a flowchart illustrating sequential processes for searching for destinations that are stored in the HDD 115, the USB memory 122, or the server 130 through the operations of the operation unit 121 performed by a user of the MFP 100. The operations (steps) in the flowchart in FIG. 9 are implemented when the CPU 112 of the MFP 100 executes a control program stored in the HDD 115.

The flowchart illustrated in FIG. 9 includes the process in step S901, instead of the process in step S301 in the flowchart of FIG. 3. In step S901, a response time from a storage device where a selected destination table is stored is determined. If it is determined that the response time is shorter than a predetermined value, a search is continued independently of an input of a second character after the input of a first character (i.e., the process does not wait for an input of a second character).

In contrast, if it is determined that the response time is longer a predetermined value, a determination is made whether or not a second character is input after the first character is input. In response to a determination that there is no input of a second character, a search based on the input first character is performed.

This provides the same effect as that obtained in the first exemplary embodiment. Furthermore, for example, it is possible that a search is performed for destinations in a destination table stored in a storage device in the MFP 100, however, causes heavy workload on the MFP 100 and the response to the search takes long time. Such a case can be dealt with according to the present exemplary embodiment since a search mode is switched depending on a response time. More specifically, if a search is performed into a storage device in the MFP 100 and many resources are assigned to other processes, sometimes the process for a search takes long time. In such a case, wasteful searches can be avoided. On the contrary even when a search is performed for destinations in destination tables stored in an external storage device, if a response is quick, a search result can be displayed immediately after an input of a first character.

In the exemplary embodiment, the response time for each storage device that stores destination tables is registered in advance by a manager, but the apparatus may be configured to automatically detect the response time. In the latter case, a response time may be detected by transmitting a test packet to each storage device and measuring a time until a response to the packet returns. Alternatively, an information history of response times from each storage device for searches performed according to instructions from a user may be maintained, so that a determination can be made based on the history.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-144610 filed Jun. 17, 2009, which is hereby incorporated by reference herein in its entirety.

What is claimed is:

1. An apparatus comprising:
a central processing unit (CPU);
a memory coupled to the CPU, the memory containing instructions that, when executed by the CPU, cause the CPU to perform operations comprising:
inputting a first character through an input operation;
performing a first search for first information that contains the first character;
performing a second search for second information that contains both of the first character and a second character when the second character is input after the first search is started, the first search is performed in a first search mode in which a search is started for the first information independently of an input of the second character after the input of the first character, or in a second search mode in which a search is started for the first information when it is determined that there is no input of the second character after the input of the first character; and
determining a response time from a storage device, wherein the first search mode is selected when the response time is shorter than a predetermined value, and the second search mode is selected when the response time is longer than the predetermined value.

2. The apparatus according to claim 1, wherein the operations further comprises:
transmitting data; and
storing the first and second information wherein the first information contains destination information that indicates destinations of transmitted data.

3. The apparatus according to claim 1, wherein the operations further comprises connecting to an external apparatus via a network, wherein a search is selected in the first search mode for the first information, and a search is selected in the second search mode for third information stored in the external apparatus.

4. The apparatus according to claim 3, wherein the operations further comprises performing the first search for the first information, and perform performing the second search for second information that contains a second character when the second character is input after the first search is performed, wherein searches are performed in the first search mode for the third information.

5. The apparatus according to claim 1, where in the operations further comprises performing the first search for the first information, and performing the second search for the second information when the second character is input after the first search is started, wherein searches are performed in the first search mode even when the response time is longer than a predetermined value.

6. The apparatus according to claim 1, wherein it is determined that there is no input of the second character when the second character is not input within a predetermined period of time after the first character is input in the second search mode.

7. A method performed by a processor comprising:
inputting a first character through an operation;
performing a first search for first information that contains the first character and performing a second search for information that contains both of the first character and a second character when the second character is input after the first search is started,
in the searches for the information, selecting one of a first search mode in which a search is started for the first information independently of the input of the second character after the input of the first character, and a second search mode in which a search is started for the first information when it is determined that there is no input of the second character after the input of the first character; and
determining a response time from the storage device, wherein the selecting selects the first search mode when the response time is shorter than a predetermined value, and selects the second search mode when the response time is longer than the predetermined value.

8. The method according to claim 7, further comprising:
transmitting data; and
storing the first and second information wherein the first information contains destination information that indicates destinations of the transmitted data.

9. The method according to claim 7, further comprising:
connecting to an external apparatus via a network; and selecting a search in the first search mode for the first information, and selecting a search in the second search mode for third information stored in the external apparatus.

10. The method according to claim 9, further comprising:
performing the first search for the first information; and
performing the second search for second information that contains a second character when the second character is input after the first search is performed, wherein the performing performs the searches in the first search mode for the third information.

11. The method according to claim 7, further comprising:
performing the first search for the first information; and
performing the second search for the second information when the second character is input after the first search is started, wherein the performing the searches in the first search mode even when the response time is longer than a predetermined value.

12. A non-transitory computer-readable medium storing a computer-executable program of instructions for causing a computer to perform operations comprising:
inputting a first character through an operation;
performing a first search for first information that contains the first character and performing a second search for information that contains both of the first character and a second character when the second character is input after the first search is started,
in the searches for the information, selecting one of a first search mode in which a search is started for the first information independently of the input of the second character after the input of the first character, and a second search mode in which a search is started for the first information when it is determined that there is no input of the second character after the input of the first character; and determining a response time from the storage device, wherein the selecting selects the first search mode when the response time is shorter than a predetermined value, and selects the second search mode when the response time is longer than the predetermined value.

13. The non-transitory computer-readable medium according to claim 12, wherein the operations further comprise:
transmitting data; and
storing the first and second information wherein the first information contains destination information that indicates destinations of the transmitted data.

14. The non-transitory computer-readable medium according to claim 12, wherein the operations further comprise:
connecting to an external apparatus via a network; and
selecting a search in the first search mode for the first information, and selecting a search in the second search mode for third information stored in the external apparatus.

15. The non-transitory computer-readable medium according to claim 14, wherein the operations further comprise:
performing the first search for the first information; and
performing the second search for second information that contains a second character when the second character is input after the first search is performed, wherein the performing performs the searches in the first search mode for the third information.

16. The non-transitory computer-readable medium according to claim 12, wherein the operations further comprise:
performing the first search for the first information; and
performing the second search for the second information when the second character is input after the first search is started, wherein the performing the searches in the first search mode even when the response time is longer than a predetermined value.

* * * * *